United States Patent [19]

Pandey

[11] 3,929,556

[45] Dec. 30, 1975

[54] NUCLEATING GROWTH OF LEAD-TIN-TELLURIDE SINGLE CRYSTAL WITH AN ORIENTED BARIUM FLUORIDE SUBSTRATE

[75] Inventor: Raghvendra K. Pandey, West Carrollton, Ohio

[73] Assignee: Cincinnati Electronics Corporation, Cincinnati, Ohio

[22] Filed: Feb. 19, 1974

[21] Appl. No.: 443,385

[52] U.S. Cl. .................. 156/611; 156/614; 148/1.5; 148/175; 252/62.3 R; 423/508

[51] Int. Cl.$^2$ .............................................. H01L 7/62

[58] Field of Search...... 148/1.6, 1.5, 175, 171–173; 117/106 R, 201; 423/508; 252/62.3 ZT, 62.3 BT; 23/301 R

[56] References Cited

UNITED STATES PATENTS

| | | | |
|---|---|---|---|
| 3,370,980 | 2/1968 | Anderson | 148/171 UX |
| 3,551,117 | 12/1970 | Yamanaka et al. | 252/62.3 ZT |
| 3,619,283 | 11/1971 | Carpenter et al. | 117/201 |
| 3,716,424 | 2/1973 | Schoolar | 148/175 |
| 3,725,135 | 4/1973 | Hager et al. | 148/1.5 X |
| 3,779,801 | 12/1973 | Halloway et al. | 148/175 X |
| 3,779,803 | 12/1973 | Lee et al. | 117/106 R |

OTHER PUBLICATIONS

Holloway et al., *Journal of Applied Physics*, Vol. 41, No. 8, July 1970, pp. 3543–3545.

*Primary Examiner*—G. Ozaki
*Attorney, Agent, or Firm*—Lowe, King & Price

[57] ABSTRACT

A method and apparatus for growing a single crystal boule of lead-tin-telluride involves nucleating growth on a crystallographically oriented barium fluoride substrate by a vapor transport expitaxy technique. A charge of polycrystalline lead-tin-telluride is positioned so it is axially spaced from the substrate within an evacuated ampoule. The charge is heated so that it vaporizes and the vapor therefrom is collected and directed to a region of the substrate via a funnel shaped conduit interposed between the substrate and the charge having a large mouth for receiving the vapor. The portion of the conduit abutting the substrate may be either conical or cylindrical to control the cross-sectional area of the crystal. The substrate is maintained cooler than the charge so that the vapor migrates within the conduit to the substrate and is deposited thereon in aligned crystalline fashion. Crystal growth is confined within the conduit whereby the final crystal boule assumes the shape of the interior of the conduit. The conduit portion abutting the substrate defines the area of the substrate initially exposed to the vapor.

25 Claims, 4 Drawing Figures

NUCLEATING GROWTH OF LEAD-TIN-TELLURIDE SINGLE CRYSTAL WITH AN ORIENTED BARIUM FLUORIDE SUBSTRATE

FIELD OF THE INVENTION

The invention relates to the production of a single crystal lead-tin-telluride boule and particularly to the growth of a bulk single crystal on a barium fluoride substrate.

BACKGROUND OF THE INVENTION

Single crystal boules of the pseudo-binary compound lead-tin-telluride, $Pb_{1-x} Sn_x Te$, are used in the fabrication of detectors for infrared radiation in the 8–14 micron band. Presently, these boules are generally produced by a vapor transport epitaxy technique wherein lead-tin-telluride vapor is deposited on a small lead-tin-telluride or lead-telluride seed crystal of very high, uniform orientation. The seed crystal nucleates the deposited vapor, causing crystal growth in a crystallographically aligned fashion. The seed crystals for this technique are expensive to produce because very precise alignment and polishing of the crystal faces are required.

While, in the prior art, lead-tin-telluride thin films have been epitaxially grown by vacuum vapor deposition on diverse substrates, including barium fluoride, the thin film technology is not generally applicable to growing bulk crystals because it does not provide a homogeneous lead-tin-telluride vapor which is necessary to grow a bulk crystal. As a consequence, multiple crystal domains would be produced if conventional thin film methods were used. To my knowledge no lead-tin-telluride crystal has ever been grown by previously existing thin film techniques to sufficient thickness to enable removal from a substrate. Even if such techniques could be used the relatively slow growth rate achievable with thin film technology would require such a long growth time (estimated to be on the order of months to grow a 10 gram crystal) as to be prohibitive from a commercial point of view.

In addition to superior mechanical strength, bulk crystals of lead-tin-telluride exhibit sensitivity and detectivity characteristics in the 8–14 micron band which are superior to thin films of the same material.

SUMMARY OF THE INVENTION

In the present invention, a commercially available crystallographically oriented barium fluoride substrate has deposited thereon lead-tin-telluride vapor, whereby on the substrate there is grown a crystallographically oriented lead-tin-telluride single crystal boule thus obviating the need for a lead-tin-telluride or lead-telluride seed crystal. Preferably, deposition occurs by spacing a charge of polycrystalline solid lead-tin-telluride from the substrate in an evacuated ampoule. The ampoule is placed in a furnace having an isothermal region with the charge located in the region. The region has a sufficiently high temperature, ranging from about 840° to 875° C, to relatively rapidly vaporize the charge and to supply sufficient vapor for forming the crystal boule at the rate of about 2 grams per day. A differential temperature, ranging from about 4° to 10° C. is maintained along the ampoule from the substrate to the charge so that the vapor tends to migrate and condense on the cooler substrate. Between the charge and the substrate there is a conduit which focuses the migrating vapor homogeneously onto a relatively small region of the substrate on which oriented growth is nucleated to form a growing crystal. The region, which has a maximum dimension on the order of 10 millimeters, is sufficiently small that there is a high probability of nucleating only a single crystal domain. The conduit is maintained in abutting relationship with the substrate so that the growing crystal fills the interior of the conduit. After sufficient growth the crystal is removed from the ampoule and separated from the substrate.

In one embodiment of the conduit adapted to produce a crystal boule having a cylindrical portion larger than the nucleating region, the conduit is a funnel-shaped member having a small end abutting the substrate to define the nucleating region and a large cylindrical portion having a mouth facing the charge. As vapor is continually deposited on a face of the growing crystal opposite the charge, the crystal grows toward the charge with the face continually increasing in diameter, in conformity with the increasing cross-section of the funnel-shaped member. Once the growth advances to the cylindrical portion of the funnel a cylindrical crystal portion is formed of a size greater than the nucleating region.

In a second embodiment, the conduit is cylindrical for growing a crystal of the same diameter as the nucleating region.

OBJECTS OF THE INVENTION

It is an object of the present invention to provide a new and improved, relatively inexpensive, relatively rapid and easily performed method of growing a lead-tin-telluride single crystal boule.

It is a further object of the present invention to provide a method of stimulating the growth of a lead-tin-telluride boule in which a commercially available and relatively inexpensive crystallographically oriented material is used to initiate oriented crystal growth.

Another object is to provide a new and improved vacuum vapor deposition crystal growth chamber.

Other objects and features of the present invention will become apparent upon a perusal of the following detailed description of two embodiments thereof in conjunction with the appended drawing.

DETAILED DESCRIPTION OF THE DRAWING

Figure 1:
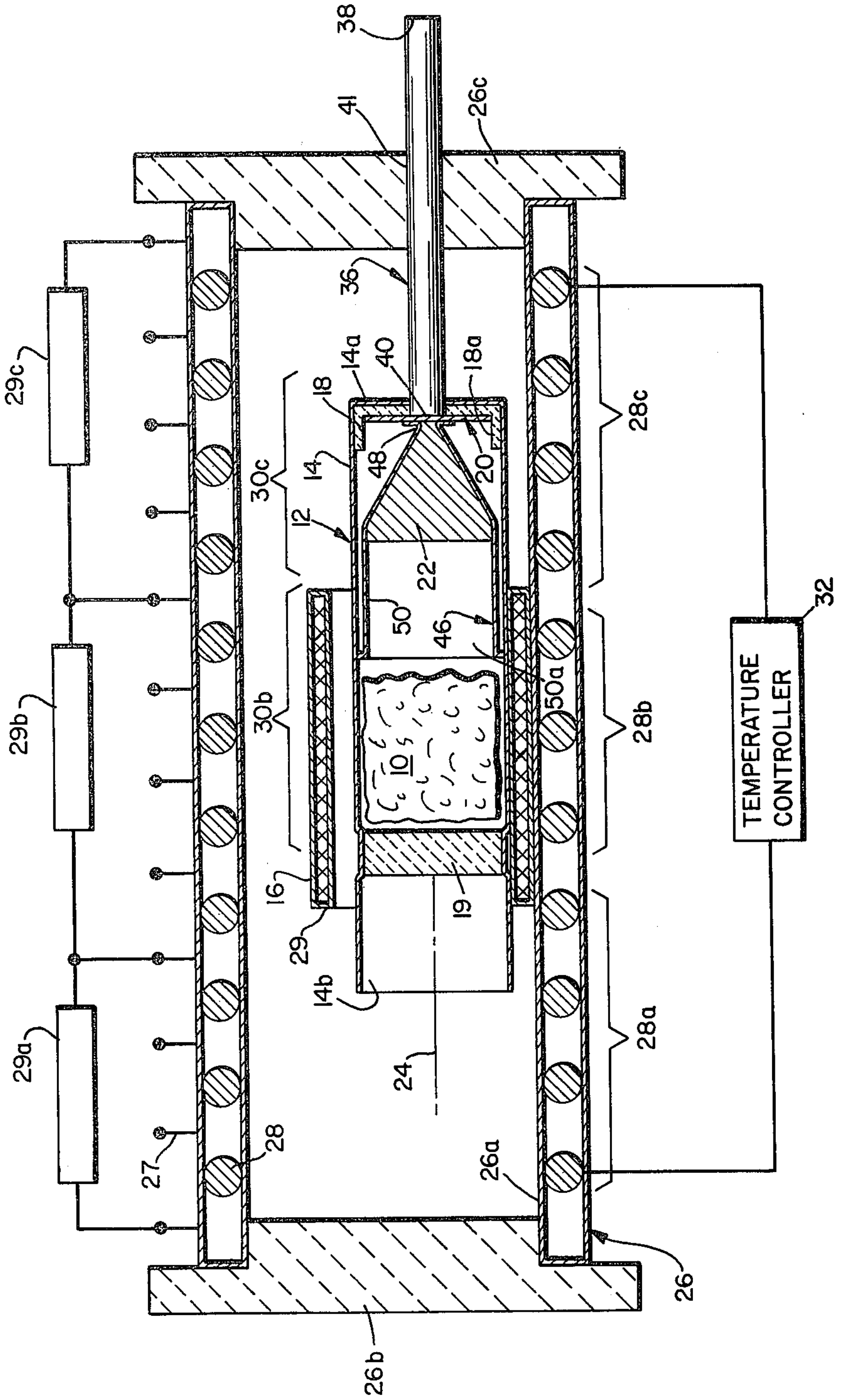
FIG. 1 is a side view of the apparatus for carrying out the present invention illustrating a first embodiment of a growth chamber within an ampoule.
Figure 2:
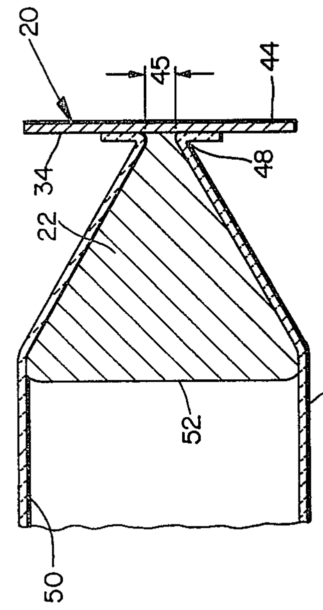
FIG. 2 is an enlarged view of the portion of FIG. 1 where the crystal is formed.

Referring to FIGS. 1 and 2, a charge 10 of solid polycrystalline lead-tin-telluride ($Pb_{1-x} Sn_x Te$) where $x$ is approximately 0.2, and a barium fluoride substrate 20 are placed in axially spaced apart relationship in a sealed quartz ampoule 12, separated by a funnel member or conduit 46. Ampoule 12 comprises a tubular portion 14 on the order of 1 inch in diameter having a centrally apertured closed end 14*a* into which a quartz rod 36 is sealably fused. The opposite end 14*b* of tubular portion 14 is an open end which is adapted to be connected to a suitable diffusion pump (not shown) for maintaining the interior of ampoule 12 at a vacuum of about $10^{-6}$ millimeters of mercury while the ampoule is sealed. An apertured quartz disc 18 having an outside diameter of about 24 millimeters and a thickness of about 6 millimeters is frictionally retained on the tubular portion 14 abutting closed end 14*a*. disc 18 is centrally drilled to a diameter of about 10 millimeters and counterbored to a diameter of about 16 millimeters to receive quartz rod 36 in the smaller diameter and a freshly cleaved barium fluoride planar substrate 20 in the counterbore. The funnel member 46 is inserted in the ampoule 12 and thereafter the charge 10 is placed behind funnel 46 and a quartz disc 19 is placed behind the charge near open end 14*a*. Sealing of the ampoule is effected by exposing the portion of the tube 14 about disc 19 to a torch so as to collapse and fuse the tube portion onto the circular periphery of the disc.

The substrate 20, which is a circular disc frictionally retained in counterbore 18*a* perpendicular to the ampoule longitudinal axis 24, is a commercially available disc of crystallographically oriented freshly cleaved barium fluoride (Ba $F_2$) crystal preferably having a thickness of between 2–3 millimeters and a diameter on the order of 1.5 centimeters. Substrate 20, which is of sufficiently high quality property to nucleate the lead-tin-telluride, may be purchased or produced in such form at significantly less cost than lead-tin-telluride seed crystals. Suitable substrates are available from Harshaw Chemicals and from Materials Research Corporation. The crystallographic orientation of substrate 20 is chosen according to the desired orientation of the boule 22 since boule 22 assumes the same crystallographic orientation as the substrate. Since Ba $F_2$ cleaves naturally in the (111) orientation, such orientation is preferred.

The use of barium fluoride as the substrate 20 is particularly critical to the operation of the invention since it has a similar lattice constant to lead-tin-telluride, and is inert at temperatures in the vicinity of 850° C. where rapid growth of a crystal is carried out according to the principles of the invention. For example, if the substrate 20 were not sufficiently inert the crystal properties could be deleteriously affected by chemical reactions or diffusion effects fed by the substrate. A further important advantage of barium fluoride is that it is readily available in high grade crystal quality.

Prior to placing charge 10 in ampoule 12, the charge is produced in the usual manner by reacting appropriate amounts of previously zone refined Pb, Sn and Te constituents within a sealed container at about 950° C. and subsequently quenching the resultant molten mixture in water to form an alloy ingot. Next, the ingot is purified by maintaining the ingot at 825°C for a few days to drive off high vapor pressure impurities.

Figure 4:
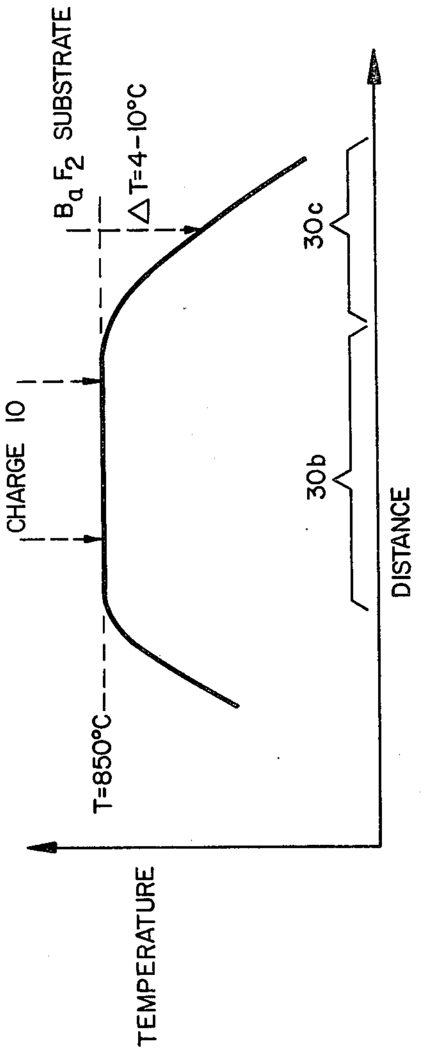
FIG. 4 is a plot of the temperature along the ampoule.

The ampoule 12 is placed in a cylindrical induction furnace 26 preferably of the general type known as a Marshall furnace. Furnace 26 comprises a refractory tube 26*a*, as of alumina, having machinable ceramic plugs or caps 26*b* and 26*c* at its opposite ends. Plug 26*c* has an off-centered hole 41 to allow rod 36 to protrude out from the furnace. Tube 26*a* is on the order of 36 inches in length and 3 inches in diameter. Electrical resistance heating coils 28 schematically shown in FIG. 1 are wrapped around the outside of tube 26*a*. Furnace 26 includes a plurality of taps 27 along the length of the continuous resistance wire winding 28. Low resistance shunts 29*a*, 29*b* and 29*c* are respectively connected in parallel with contiguous sections 28*a*, 28*b* and 28*c* of winding 28 for altering the current distribution in the winding. The resistances of the shunts are chosen so that the current in central winding section 28*b* is greater than the current in the sections 28*a* and 28*c* at the sides of the central section. In a trial and error process well known in the art, taps and shunts may be selected to produce the temperature profile illustrated in FIG. 4 comprising an isothermal region 30*b* encircled by winding section 29*b* and a region 30*c*, encircled by winding section 29*c*, having a temperature which decreases from the temperature of the isothermal region 30*b* as the distance from region 30*b* increases. To establish this predetermined temperature profile, the heating coils 28 are electrically energized by a temperature controller 32 responsive to a thermal sensor (not shown) within the oven.

The ampoule 12 is placed sufficiently deep within the oven so that the charge 10 is located in isothermal region 30*b* and substrate 20 is in region 30*c*. Heating coils 28 are excited by controller 32 for maintaining region 30*b* and charge 10 at a temperature preferably selected from the range of 840° – 850° C. At these temperatures and the stated vacuum pressure sufficient homogeneous lead-tin-telluride vapor composed of molecules having uniform mobility is obtained from charge 10 to rapidly grow crystal 22. The 840° – 850° C. range of temperatures for the charge 10, while not critical, is important because at these temperatures a homogeneous crystal can be produced with an optimally fast growth rate on the order of 2 grams per day. Actually, the temperature should be as close as possible to the 880° C. melting temperature of lead-tin-telluride in vacuum to achieve the fastest growth rate. Because the production of molten lead-tin-telluride would be deleterious to the epitaxy process, since such molten charge may migrate to substrate 20, and in order to leave a safety factor so that the crystal 22 would not be ruined in the event of some failure such as an overshoot in current supply from temperature controller 32, I prefer a maximum temperature of 850° C. A maximum temperature of up to 875° C. would be useable with a very stable and reliable temperature controller. It is also believed possible to achieve about the same growth rate at a lower temperature providing the ampoule is filled with in inert gas such as argon.

The substrate 20 and the charge 10 are longitudinally spaced apart a sufficient distance (on the order of several inches) for the substrate to be maintained at a temperature from 4° to 10° C. less than that of the charge as a consequence of the temperature profile of oven 26. This temperature difference allows the vapor molecules to be collected on substrate 20. To aid in establishing isothermal region 30*b* uniformly along the length of charge 10 to provide uniform mobility to the vapor molecules a cylindrical isothermal liner 29 may be provided generally coaxially surrounding ampoule 12 at the location of the charge. Isothermal liner 29, which is commercially available from Dynatherm Corporation, is a double walled cylinder of Inconel (nickel-chromium alloy) filled with high purity sodium metal 16, an excellent heat conductor, for keeping liner 29 at a uniform temperature.

For the purposes of the invention, the furnace 26 may be either of the horizontal or vertical type since the orientation of the ampoule with respect to gravity is basically irrelevant. Furnace 26 is conveniently a horizontally elongated furnace in which the ampoule 12 is disposed horizontally. In this arrangement, the charge 10 and substrate 20 are horizontally spaced apart and substrate 20 is vertically disposed.

To cool the substrate 20 and maintain the temperature of the substrate constant in spite of possible temperature variations in furnace 26, an optical quality quartz rod 36 forms a heat sink having one end in contact with substrate 20 and another end at ambient room temperature, thereby conducting heat energy from the substrate. Rod 36, which is long enough so that one of its ends 38 protrudes several inches outside of furnace 26 through an aperture 41 in end cap 26*c*, is chosen to have a diameter on the order of one centimeter, to provide sufficient thermal inertia to maintain the substrate temperature constant. The end 40 of rod 36 within the furnace sealably passes through end 14*a* of ampoule 12 and abuts the back face 44 of substrate 20.

In one embodiment of my invention, illustrated in FIGS. 1 and 2, I employ a generally conical quartz funnel or growth chamber 46 aligned with axis 24 and interposed between the charge and the substrate. Funnel 46 is a conduit for directing the vapor from charge 10 to a small diameter region 45 on substrate front face 34. By selecting region 45 to be suitably small, so that its greatest cross-sectional dimension is in the range between 4 and 10 millimeters, there is a high probability of obtaining a single crystal growth. If the greatest cross-sectional dimension exceeds 10 millimeters there is some possibility of multiple crystal domains arising in different parts of the region. Abutting the substrate front face 34 is a small, circular slightly belled open end 48 of funnel 46, having a diameter between 4 and 10 millimeters, which tapers preferably for about 1 centimeter to an elongated 1.5 centimeter diameter cylindrical portion 50 having a flanged open end or mouth 50*a* frictionally retained inside the perimeter of tube 14. End 48 is belled to provide a vapor tight seal between the funnel 46 and the substrate 20. The open end 50*a* terminates near charge 10 whereby the vapor is received by end 50*a*, transported and focused within the funnel 46 to the small region 45.

In this embodiment, the initial crystal growth in region 45 serves as a seed crystal for growth of a frustoconical boule within funnel 46. As layers of lead-tin-telluride are continually deposited on the exposed flat face 52 of crystal boule 22, face 52 continually grows toward charge 10 and continually increases in diameter, conforming to the cross-section of funnel 46. After 1 centimeter of growth, crystal growth becomes cylindrical and of a diameter of 1.5 centimeters.

After crystal 22 has been grown to the desired length, the temperature of the furnace is gradually decreased to about 500° C. at about 20° – 40° C per hour to prevent cracking the crystal. Next the ampoule 12 is quickly withdrawn from the furnace and is opened by cracking or sawing ampoule tube 14 in the vicinity of disc 19. The funnel 46 is then pulled from the opened end of the ampoule 12. The frictional fit between the substrate 20 and its holder 18 is preferably such that the substrate is separated from the holder and removed with the funnel 46 attached to the end of boule 22. The substrate 20 is then easily separated from boule 22 by twisting the substrate. Thereafter, boule 22 is removed from funnel 46 via mouth 50. Actually, once the crystal boule has achieved a length of about 1 millimeter is has sufficient self support to be removed from the substrate.

When the FIG. 1 structure was used to grow a lead-tin-telluride crystal in accordance with the stated method, a single crystal boule of (111) crystallographic orientation, weighing approximately 16 grams, was grown over the course of a week. The boule 22 was about 2.5 centimeters long and had a diameter at flat face 52 of about 1.5 centimeters.

Figure 3:
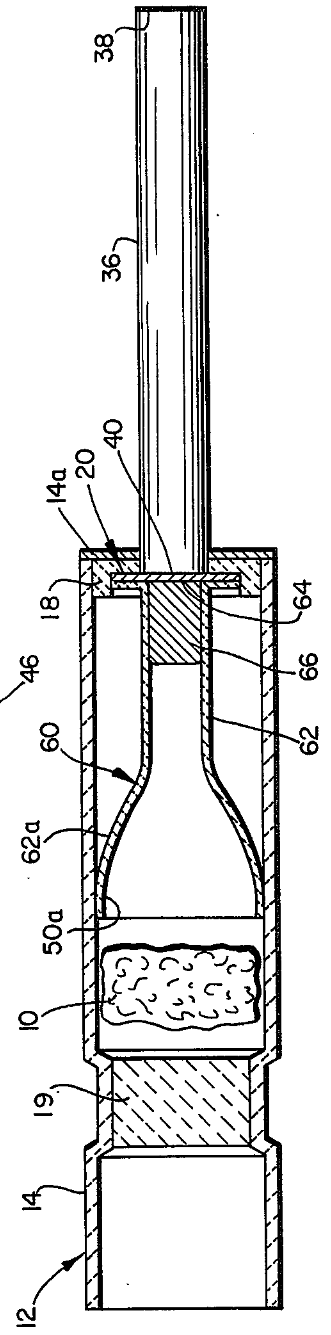
FIG. 3 is a side view of the ampoule of FIG. 1 illustrating a second embodiment of a growth chamber.

With the embodiment of FIG. 3 there is grown a cylindrical boule having a diameter on the order of 1 centimeter. This embodiment employs a funnel 60, having an open mouth 50*a* facing charge 10. Mouth 50*a* tapers to straight cylindrical portion 62 which abuts substrate 20. Cylindrical portion 62 preferably terminates in a radially outward flange 62*a* to centrally locate portion 62 in the counterbore in plug 18. The inside diameter of portion 62, which is on the order of 1 centimeter diameter, defines nucleating region 64 on substrate 20. The method, insofar as temperature and pressure are concerned, of growing a cylindrical, single crystal boule 66 in portion 62 is the same as described in connection with the FIG. 1 chamber.

In using the FIG. 3 chamber, as indicated, I have grown a cylindrical, single crystal boule 66 of about 1 centimeter in diameter, a particularly useful diameter for infrared detector fabrication, and 1.5 centimeter in length, weighing about 10 grams, at a growth rate of about 2 grams per day. I have found that there is a very low, virtually zero, probability of multiple crystal domains arising when nucleating a barium fluoride region on the order of 1 centimeter in diameter when the FIG. 3 chamber is used.

Having described two specific embodiments of the invention it should be apparent that numerous modifications are possible within the spirit and purpose of the invention. Consequently, it is intended that the description of this specific embodiment be interpreted primarily as illustrative of the inventive concept and not in a limiting sense.

What is claimed is:

1. The method of producing a single crystal of lead-tin-telluride comprising depositing homogeneous lead-tin-telluride vapor on a crystallographically oriented barium fluoride substrate to form a growing bulk single crystal having the same orientation as the substrate and removing the single crystal from the substrate after sufficient growth of the single crystal has occurred for the crystal to be self-supporting.

2. The method of claim 1 wherein said depositing step comprises heating a solid charge of lead-tin-telluride to a first temperature at which the charge will vaporize, heating the substrate to a temperature slightly less than the first charge, and heating the intervening volume between the substrate and volume so that a monotonic temperature variation exists between the substrate and source, the intervening volume being small enough in cross section to confine the vapor, the temperature in the volume and the temperature difference between the substrate and source being such that the vapor migrates toward and condenses on the substrate.

3. The method of claim 2 wherein the vapor is transported to only a region of said substrate which is sufficiently small to nucleate only a single lead-tin-telluride crystal domain, said region having a largest dimension ranging between 4 and 10 millimeters.

4. The method of claim 3 further comprising transporting the vapor to a region larger than and including the instantaneous area of said growing crystal whereby said growing crystal grows in cross-sectional area.

5. The method of claim 2 wherein said depositing is done while maintaining the temperature of the substrate in the range of 4°–10°C. less than the temperature of the charge whereby the vapor migrates to the substrate.

6. The method of claim 5 wherein said heating maintains the temperature of said charge at a temperature selected from the range of 840° to 875° C.

7. The method of claim 2 further comprising providing a conduit abutting the substrate and wherein said depositing step includes directing said vapor through said conduit onto said substrate region, said conduit having a cross section to confine the flow of said vapor between the charge and substrate.

8. The method of claim 7 wherein said conduit comprises a straight cylinder.

9. The method of claim 8 wherein said cylinder is circular having a diameter of approximately 1 centimeter for exposing a 1 centimeter diameter region of the substrate to deposition of said vapor.

10. The method of claim 2 wherein the vaporized charge is vaporized and deposited onto said substrate in an ampoule having a pressure of approximately $10^{-6}$ millimeters of mercury.

11. The method of claim 10 wherein the charge is funneled onto the substrate to a region having its greatest cross-sectional dimension between 4 and 10 millimeters.

12. The method of claim 11 wherein said depositing is done while maintaining the temperature of the substrate in the range of 4°–10°C. less than the temperature of the charge whereby the vapor migrates to the substrate.

13. The method of claim 10 wherein the solid charge is isothermally heated throughout its volume to provide uniform mobility to the vapor molecules.

14. The method of claim 13 further including the step of heat sinking the substrate while the vapor is deposited thereon so as to provide sufficient thermal inertia to maintain the substrate temperature constant.

15. The method of claim 14 wherein said depositing is done while maintaining the temperature of the substrate in the range of 4°–10°C. less than the temperature of the charge whereby the vapor migrates to the substrate.

16. The method of claim 13 wherein said depositing is done while maintaining the temperature of the substrate in the range of 4°–10°C. less than the temperature of the charge whereby the vapor migrates to the substrate.

17. The method of claim 10 further including the step of heat sinking the substrate while the vapor is deposited thereon so as to provide sufficient thermal inertia to maintain the substrate temperature constant.

18. The method of claim 17 wherein said depositing is done while maintaining the temperature of the substrate in the range of 4°–10°C. less than the temperature of the charge whereby the vapor migrates to the substrate.

19. The method of claim 10 wherein said depositing is done while maintaining the temperature of the substrate in the range of 4°–10°C. less than the temperature of the charge whereby the vapor migrates to the substrate.

20. The method of claim 2 wherein the solid charge is isothermally heated throughout its volume to provide uniform mobility to the vapor molecules.

21. The method of claim 20 further including the step of heat sinking the substrate while the vapor is deposited thereon so as to provide sufficient thermal inertia to maintain the substrate temperature constant.

22. The method of claim 21 wherein said depositing is done while maintaining the temperature of the substrate in the range of 4°–10°C. less than the temperature of the charge whereby the vapor migrates to the substrate.

23. The method of claim 20 wherein said depositing is done while maintaining the temperature of the substrate in the range of 4°–10°C. less than the temperature of the charge whereby the vapor migrates to the substrate.

24. The method of claim 2 further including the step of heat sinking the substrate while the vapaor is deposited thereon so as to provide sufficient thermal inertia to maintain the substrate temperature constant.

25. The method of claim 24 wherein said depositing is done while maintaining the temperature of the substrate in the range of 4°–10°C, less than the temperature of the charge whereby the vapor migrates to the substrate.

* * * * *